(12) United States Patent
Subramanian et al.

(10) Patent No.: US 12,017,620 B2
(45) Date of Patent: Jun. 25, 2024

(54) MODULAR CARGO PLATFORM FOR AUTOMOTIVE APPLICATIONS

(71) Applicant: MAGNA INTERNATIONAL INC., Aurora (CA)

(72) Inventors: Azhagu Subramanian, Troy, MI (US); Gianfranco Gabbianelli, Birmingham, MI (US)

(73) Assignee: MAGNA INTERNATIONAL INC., Aurora (CA)

(*) Notice: Subject to any disclaimer, the term of this patent is extended or adjusted under 35 U.S.C. 154(b) by 483 days.

(21) Appl. No.: 17/295,468

(22) PCT Filed: Nov. 20, 2019

(86) PCT No.: PCT/US2019/062420
§ 371 (c)(1),
(2) Date: May 20, 2021

(87) PCT Pub. No.: WO2020/106846
PCT Pub. Date: May 28, 2020

(65) Prior Publication Data
US 2022/0017019 A1    Jan. 20, 2022

Related U.S. Application Data

(60) Provisional application No. 62/770,194, filed on Nov. 21, 2018.

(51) Int. Cl.
*B60R 9/06* (2006.01)
*B60Q 1/00* (2006.01)
(Continued)

(52) U.S. Cl.
CPC ............ *B60R 9/065* (2013.01); *B60Q 1/0035* (2013.01); *B60Q 1/2623* (2013.01); *B62D 63/025* (2013.01)

(58) Field of Classification Search
CPC .. B60R 8/06; B60R 8/065; B60R 8/08; B60R 8/10–12; B60R 9/06; B60R 9/065; B60R 9/08; B60R 9/10; B60R 9/12
(Continued)

(56) References Cited

U.S. PATENT DOCUMENTS 4,842,326 A    6/1989  DiVito
4,887,859 A *  12/1989  Aper .................... B62D 47/006
                                               296/193.03
(Continued)

FOREIGN PATENT DOCUMENTS

CN    102285377 A    12/2011
DE    102015016954 A1    7/2016
(Continued)

*Primary Examiner* — Dennis H Pedder
(74) *Attorney, Agent, or Firm* — Dickinson Wright PLLC

(57) ABSTRACT

A system for modifying the structure of a unibody vehicle includes a vehicle body having a unibody construction and a first module attached to the vehicle body. The first module is removable from the vehicle body and replaceable with a second module having a different size and/or functionality. A rear portion of the first module may be removed from the first module and attached to the second module. The first module may be a stock cargo module, and the second module may be an aftermarket module. The rear portion may be a stock tail tamp and/or sensor module. The rear portion may be removed before or after removing the first module from the vehicle body, and may be attached to the second module before or after attaching the second module to the vehicle body.

11 Claims, 2 Drawing Sheets

(51) Int. Cl.
*B60Q 1/26* (2006.01)
*B62D 63/02* (2006.01)

(58) Field of Classification Search
USPC .............. 296/26.01, 26.08, 193.08, 193.04
See application file for complete search history.

(56) References Cited

U.S. PATENT DOCUMENTS

| 5,000,501 | A | * | 3/1991 | Cunha ..................... B60J 7/08 |
| | | | | 29/401.1 |
| 2007/0120654 | A1 | | 5/2007 | Walton |
| 2008/0168644 | A1 | | 7/2008 | Hedderly |
| 2009/0200823 | A1 | | 8/2009 | Vertanen |
| 2017/0197678 | A1 | | 7/2017 | Scaringe |
| 2017/0197679 | A1 | * | 7/2017 | Scaringe ................. B60K 1/02 |
| 2017/0267168 | A1 | * | 9/2017 | Dylewski, II ............ B60Q 3/82 |
| 2017/0274940 | A1 | | 9/2017 | Povinelli et al. |
| 2018/0170452 | A1 | * | 6/2018 | Reiners .................. B60R 11/06 |

FOREIGN PATENT DOCUMENTS

| EP | 2589512 B1 | 2/2015 |
| WO | 2013156639 A1 | 10/2013 |

* cited by examiner

MODULAR CARGO PLATFORM FOR AUTOMOTIVE APPLICATIONS

CROSS-REFERENCE TO RELATED APPLICATIONS

This U.S. National Stage Patent Application claims the benefit of PCT International Patent Application Serial No. PCT/US2019/062420 filed Nov. 20, 2019 entitled "MODULAR CARGO PLATFORM FOR AUTOMOTIVE APPLICATIONS" which claims the benefit of and priority to U.S. Provisional Patent Application Ser. No. 62/770,194 filed on Nov. 21, 2018, titled "Modular Cargo Platform For Automotive Applications," the entire disclosures of which are hereby incorporated by reference.

TECHNICAL FIELD

The present disclosure relates to cargo platforms for automotive vehicles. More particularly, the present disclosure relates to modular cargo platforms for use in automotive vehicles.

BACKGROUND OF THE DISCLOSURE

Traditional passenger vehicles, such as internal combustion engine based vehicles, electric vehicles, or hybrid electric vehicles, are in common use. Such vehicles include a vehicle body, chassis, powertrain, and engine or motor compartment, among other vehicle structure. One type of vehicle body structure is a body on frame structure, in which a chassis portion of the vehicle is constructed separately from a vehicle body portion. The vehicle body portion is attached to the chassis to define the overall vehicle. The chassis may also support other vehicle structure, such as the engine and drivetrain. The body on frame construction is currently most commonly used on pickup traditional pickup trucks and SUVs, as well many fleet vehicles. The body on frame construction allows for the vehicle body to be updated and or changed and still use the same underlying chassis construction, thereby reducing assembly costs while allowing for modifications or updates to overall vehicle appearance.

Another type of vehicle body construction is a unibody construction. A unibody construction integrates the frame or chassis with the body, such that it is a single piece. The unibody construction can result in weight savings, as the traditional heavy steel construction of the separate chassis is not used. The reduced weight results in better fuel of power efficiency. However, given the single body construction, changes to the overall vehicle effectively require changes to the entire structure of the vehicle, because there is not a separate chassis on which an updated body style is simply attached.

Unibody vehicles currently in production do not provide the ability to attach aftermarket modules, because the body structure is already formed as a single piece. If changes to the cargo area or other portion of the unibody are desired, a completely different unibody design is required, requiring additional manufacturing space and setups.

In view of the foregoing, there remains a need for improvements to the modularity of unibody vehicles.

SUMMARY OF THE INVENTION

A system for modifying a vehicle structure includes a vehicle body and a first module detachably attached to a structure of the vehicle body at an interface having plurality of mounting points with a predetermined spacing. The system further includes a detachable portion of the first module, wherein the rear portion is detachably attached to a body portion of the first module.

The system also includes a second module with mounting points having the predetermined spacing. The first module is detachable from the vehicle body and replaceable on the vehicle body with the second module. The detachable portion is detachable from the body portion of the first module and subsequently attachable to second module.

In one aspect, the detachable portion includes lamps or sensors configured to operate with both the first module and the second module, such that additional lamps or sensors are not attached to the second module.

In one aspect, the first module is a rear module, and the detachable portion is a rear portion or the rear module.

In one aspect, the body portion of the first module defines a curved surface, and the detachable portion includes a corresponding curved surface that mates with the curved surface of the first module.

In one aspect, the vehicle structure is a unibody vehicle structure.

In one aspect, the first module is a cargo platform.

In one aspect, the second module has a different overall size relative to the first module.

In one aspect, the second module includes a body portion and a recess, wherein the recess is sized and arranged to receive the detachable portion of the first module.

In one aspect, the body portion of the second module overhangs the recess.

In one aspect, the first and second module are electrically connectable to the vehicle body.

In one aspect, the detachable portion is electrically connectable to the first module and the second module.

In another aspect, a method for modifying a vehicle structure is provided. The method includes providing a vehicle body and a first module detachably attached thereto via plurality of mounting points disposed on the vehicle body with a predetermined spacing. The method further includes detaching the first module from the vehicle body. The method also includes detaching a rear portion from the first module.

The method further includes attaching a second module to the vehicle body via the plurality of mounting points after detaching the first module. The method also includes attaching the rear portion to the second module after detaching the rear portion from the first module.

In one aspect, the detachable portion includes lamps or sensors, and additional lamps or sensors are not attached to the second module.

In one aspect, the first module and second module have different overall sizes.

In one aspect, the vehicle body is a unibody structure.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
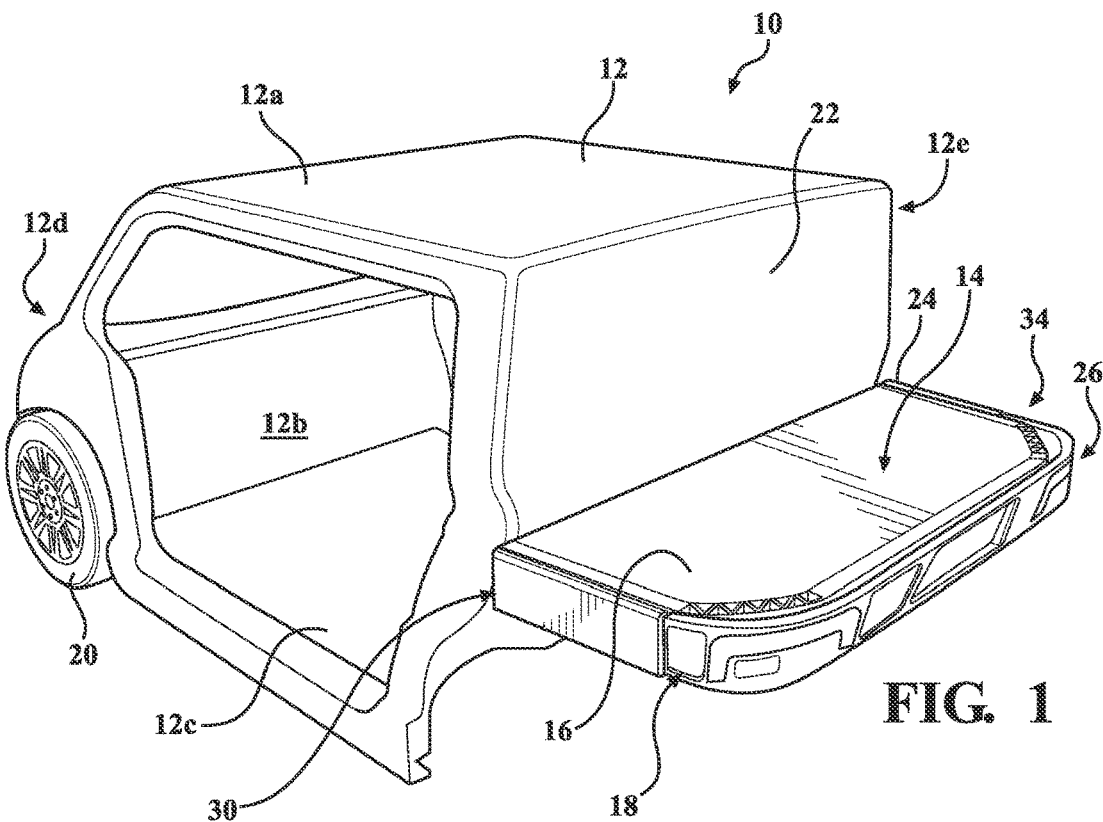
FIG. 1 is a perspective view of a vehicle having a first module attached to a vehicle body.
Figure 2:
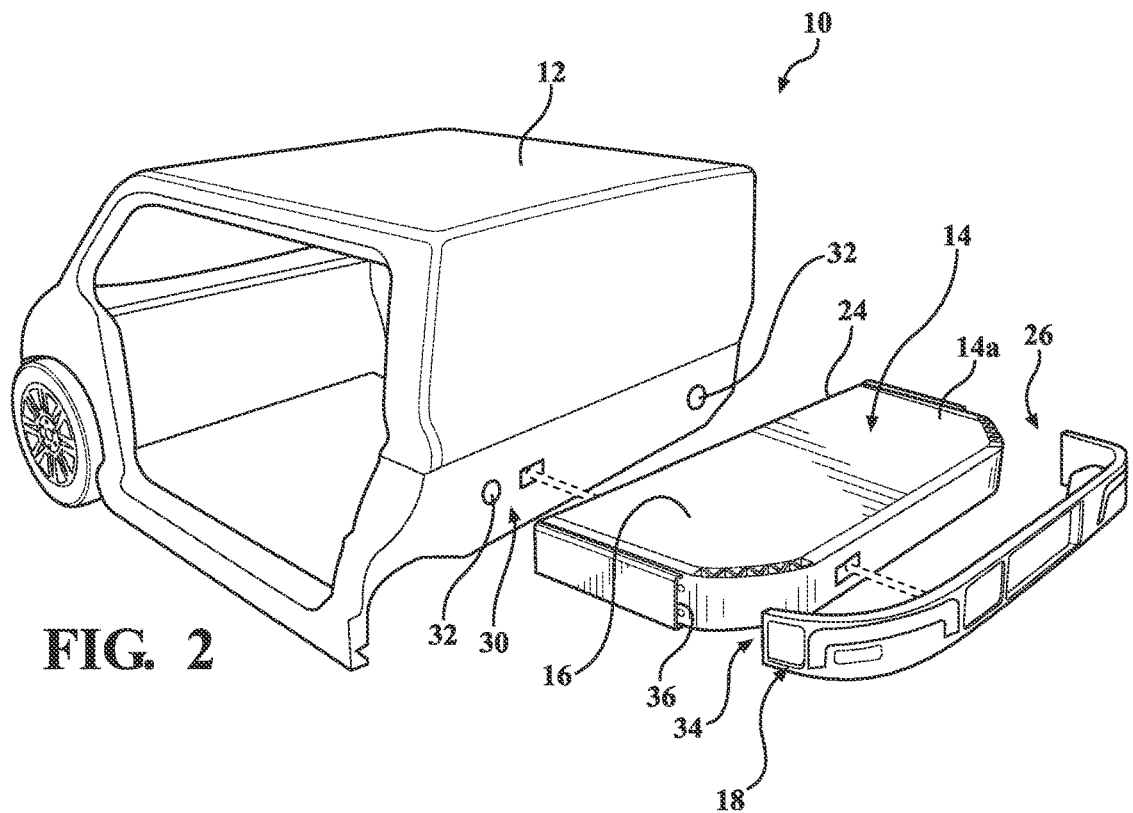
FIG. 2 is an exploded view of the vehicle with the first module detached from the vehicle body, and a tail lamp module detached from the first module.

Referring to FIG. 1, a system 10 including a vehicle body 12 and a first module 14 attached to the vehicle body 12 is provided. The first module 14 may be in the form of a cargo module, and may include a body portion 16 and a rear portion 18 that are detachably coupled together. The first module 14 is detachably coupled to the vehicle body 12. The rear portion 18 may also be referred to as a detachable portion.

The vehicle body 12 may be in the form of a unibody vehicle structure, in which the vehicle body defines an exterior body 12a and an interior cabin 12b therein, and including a bottom structure 12c. The unibody construction of the vehicle body 12 allows for wheels 20 to be attached to the vehicle body 12 rather than being attached to a separate bottom chassis component. The wheels 20 may include integrated wheel-end motors, or may be driven by a separate engine and drivetrain or a separate battery powered motor that drives the wheels 20 via a driveshaft or half shaft. The unibody construction of the vehicle body 12 may also support various vehicle interior components, vehicle doors, and other vehicle mounted components in a manner known in the art. While the vehicle body 12 is described as being a unibody construction, it will be appreciated that the present disclosure may also apply to non-unibody constructions.

The vehicle body 12 may include a front end 12d, which may include the windshield and other traditional vehicle front-end components, and the vehicle body may further include a rear structure 22 integral with the vehicle body 12. The rear structure 22 is disposed rearward from the interior 12c defined by the vehicle body 12.

The first module 14 may be in the form of a cargo module, as described above. The first module 14 may include a front end 24 and a rear end 26. The front end 24 may be configured to mate with the rear structure 22 of the vehicle body in a detachable manner. Put another way, the first module 14 may be a separable and separate structure from the unibody vehicle body 12. While the first module 14 may be a separate structure relative to the vehicle body 12, the vehicle body 12 may still be referred to a unibody construction, as the vehicle may still operate and be structurally sound even without the first module 14 being attached.

The first module 14 may be attached to the vehicle body via fasteners (not shown), which may be in the form of any traditional fastener style that can join the front end 24 of the first module 14 to the rear structure 22 of the vehicle body 12 in a secure manner, while allowing the first module 14 to be detached at a subsequent time, while also allowing for the first module 14 to be re-attached to the rear structure 22 of the vehicle at a further time. Alternatively, another module may be attached to the rear structure 22 at a later time after detaching the first module 14. For example, the fasteners may be in the form of screws, bolts, clamps, or the like.

The first module 14 may be attached to the rear structure 22 of the vehicle body 12 via the fasteners to define an interface 30 between the first module 14 and the vehicle 12. The interface 30 may define a plurality of mounting points 32 for the fasteners. The mounting points 32 may be determined based on a standard mounting pattern between the first module 14 and the vehicle body 12, such that the mounting pattern and spacing between mounting points may be known for applying to other modules. The mounting pattern spacing may be determined based on vehicle load/stiffness requirements, such that a sufficient spacing may be determined to sufficiently retain the module 14 to the structure 22 of the vehicle.

The first module 14 in the form of a cargo module may be a stock cargo platform that may be supplied initially along with the vehicle body 12. The first module 14 in the form of a cargo platform may define a flat upper surface 14a onto which cargo may be carried. The first module 14 may also have other forms, such as a cargo holding structure, like a trunk or a hatch.

The rear end 26 of the first module 14 may include an interface 34 between the body portion 16 and the rear portion 18. The rear portion 18 may be attachable to (and detachable from) the body portion 16 at the interface via a plurality of fasteners (not shown) spaced apart at distinct mounting points 36 that are defined at the interface 34. The spacing of the mounting points 36 may be predetermined such that further modules or detachable portions may be constructed to include the same mounting point spacing, such that the rear portion 18 may be detached from the first module 14 and later attached to a further module.

The rear portion 18 may be in the form of a tail lamp module and/or sensor module. The rear portion 18 has a shape that complements the shape of the rear end of body portion 16 of the first module 14 such that, when the rear portion 18 is attached to the body portion 16 to define the first module 14, the first module 14 has a continuous shape with a continuous edge. The rear portion 18 may in some cases act as a bumper. However, in other cases, the rear portion 18 may be included in additional to a separate bumper portion, which may be part of the module 14 or part of the vehicle structure 22.

The rear portion 18 may have other forms. For example, rather than including tail lamps or sensors, the rear portion 18 may include no lamps or sensors and may instead simply be a structural component to fill out the shape of the first module 14. The rear portion 18 may have various colors or functionality, and may be replaced as part of the first module 14 with other styles of the rear portion 18. The rear portion 18 may also be configured to include other vehicle components, if desired. For example, the rear portion 18 may include cameras, controllers, communication devices, or the like.

Figure 3:
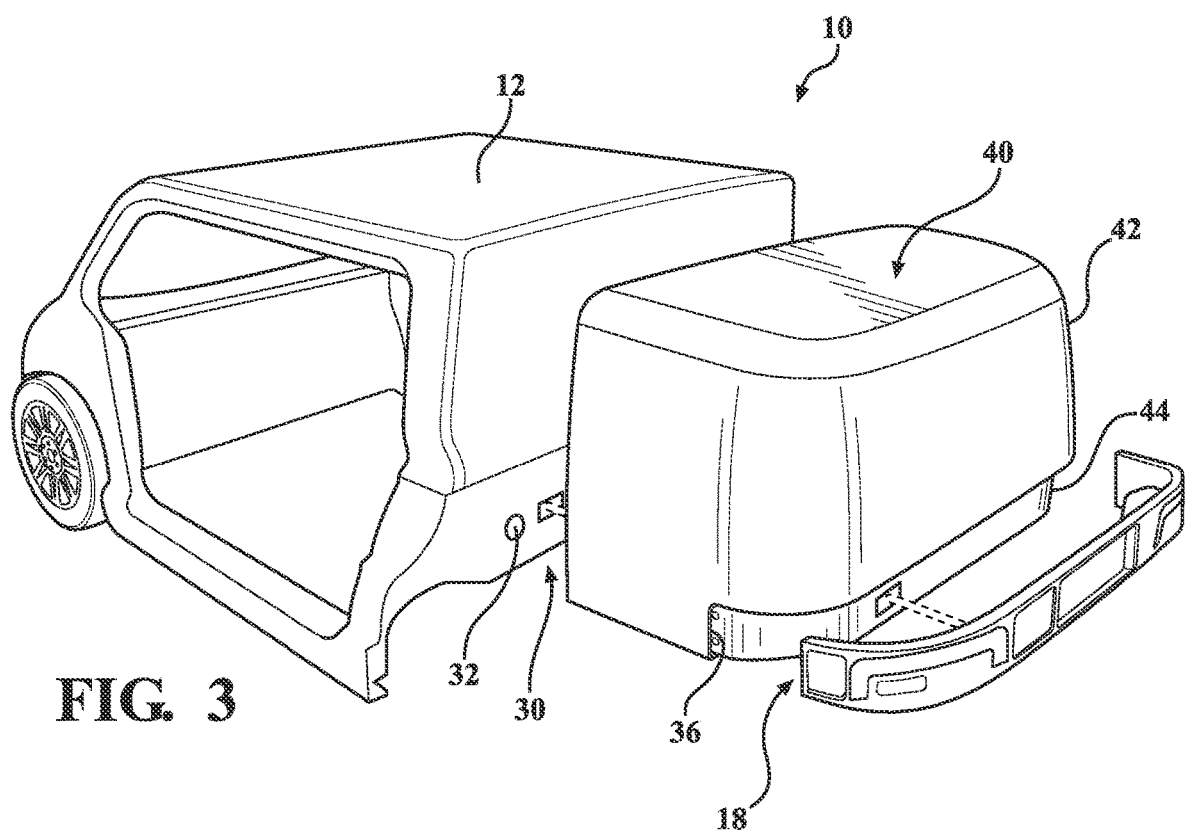
FIG. 3 is an exploded view of the vehicle with a second module detached from the vehicle body and the tail lamp module detached from the second module.
Figure 4:
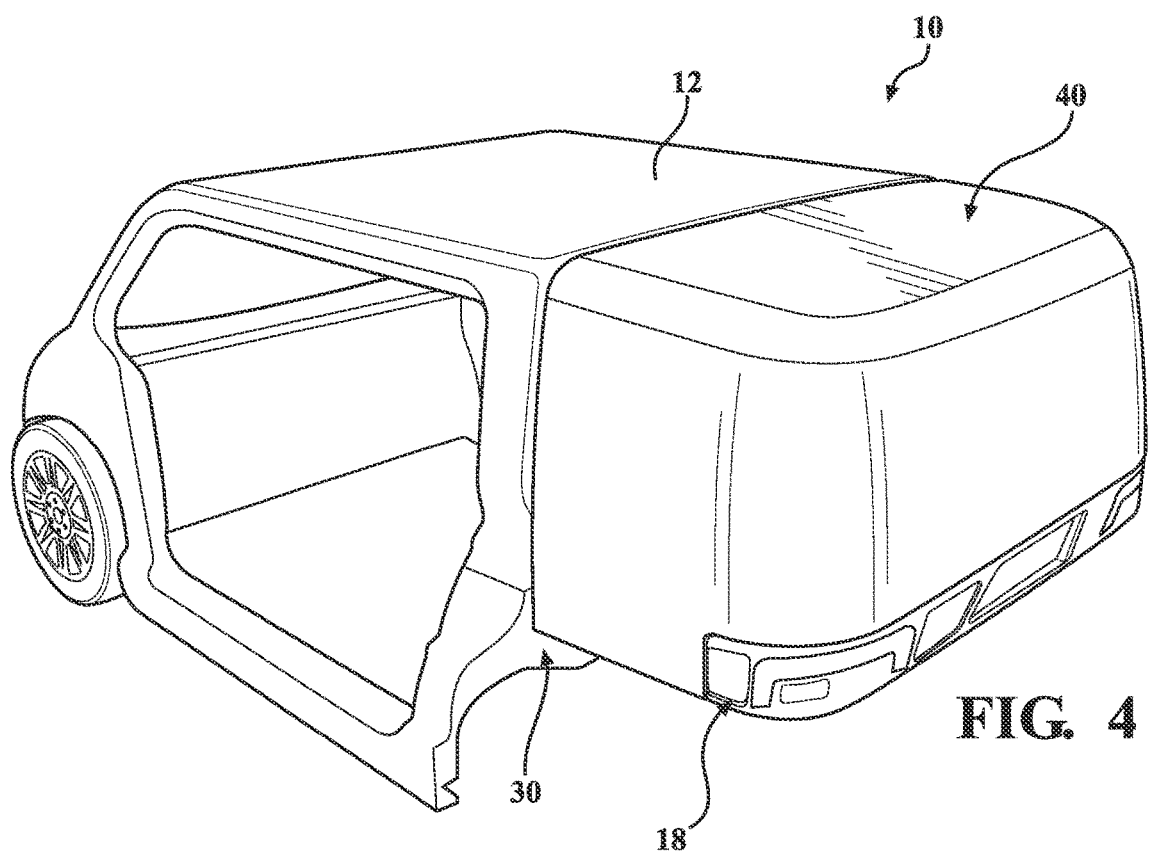
FIG. 4 is a perspective view of the vehicle with the second module and tail lamp module assembled with the vehicle body.

With reference to FIGS. 3 and 4, a second module 40 is shown that may replace the first module 14 on the vehicle 12. The second module 40 may include the same attachment points as the first module 14, and may therefore be attachable to the rear structure 22 of the vehicle 12 at the interface 30 via the same mounting points 32. The second module 40 may include a body portion 42 and a recess 44 formed at a rear end of the body portion that may be sized and arranged to receive the rear portion 18 of the first module 14. By using the rear module 18 with the second module 40, there is no need to attach additional aftermarket components (such as sensors or lamps) to make the vehicle street legal when the rear portion 18 already includes these types of components.

The second module 40 may have a different overall size relative to the first module 14, and may be arranged to provide different functionality. For example, the second module 40 may have a greater height than the first module 14. The second module 14 may be arranged as desired by aftermarket manufacturers, or OEMs, to suit the needs of an aftermarket consumer or industry. For example, the second module 14 may be configured for food delivery, in which the second module 40 may be specially insulated or configured to provide heat or cooling to an internal chamber of the second module 40. The second module 40 may also be configured to provide infrastructure monitoring or to act as a charging platform. The second module 40 may be further configured to provide other uses and benefits. The second module 40 could simply be configured as providing additional covered cargo space for the vehicle. As described above, the second module 40 may have a different shape and size and the first module 14. However, it will be appreciated that the second module 40 may also replace the first module 14 when the second module 40 is the same size and shape.

Depending on the arrangement and components included with the second module 40, the second module 40 may be configured to receive power from one of the power sources of the vehicle 12. Power may be provided by an electrical connection between the vehicle body 12 and the rear module 40 at the same electrical interface that would communicate with the tail lamps and/or sensors of the rear portion 18 of the first module 14. Power may be provided by vehicle battery or range extender module (not shown) that are also connected with the vehicle body 12. Accordingly, the rear portion 18 that is detachable from the first module 14 may also be electrically connected to both the first module 14 and the second module 40.

The rear portion 18 is attachable to the second module 40 in the same manner in which it was attached to the body portion 16 of the first module. Accordingly, the second module 40 may include similarly spaced attachment points such that the rear portion 18 may be attached. When the rear portion 18 is attached to the second module 40, it may be considered part of the second module 40.

In another approach, the rear portion 18 may not be detachable from the first module 14, and may instead be integrated into the first module 14. In this approach, the second module 40 may similarly include an integrated rear portion 18 that is provided with the second module 40. Alternatively, the rear module 40 may still include the recess 44, and a separate rear portion 18 that was not part of the first module 40 may be combined with the rear module 40 to become part of the rear module 40.

The above described arrangement provides for modular modification of a unibody vehicle without requiring substantial redesign of the unibody to suit different end user needs. The modification of the vehicle may be performed quickly and easily and without the need for special tools or mechanical expertise.

By allowing for the detachment of the rear portion 18 and installation on a further module, such as the second module 40, components such as lights, sensors, cameras, controllers, or the like need not be provided with each further module that is manufactured. Thus, the components provided in the rear portion 18 can be re-used multiple times with different types of modules.

A method for operating the system 10 may include providing the vehicle body 12 with the first module 14 attached thereto, with the first module 14 including the rear portion 18 attached thereto. The first module 14 may be detached from the vehicle body 12, and the rear portion 18 may be detached from the body portion 16 of the first module 14. The rear portion 18 may be detached either before or after the first module 14 is detached from the vehicle body 12.

After detaching the first module 14, the second module 40 may be attached to the vehicle body 12. The rear portion 18 may be attached to the second module 40, and this step may be performed either before or after the second module 40 is attached to the vehicle body 12.

The above steps may be repeated to replace the second module 40 with another module, such as the previously detached first module 14, or another module type. Thus, the system 10 allows for the vehicle body 12 to have various module styles attached thereto to define a variety of different overall vehicle with different functionality.

The method may further includes making and breaking electrical connections between the vehicle body and the first module 14 or second module 40, as well as between the rear portion 18 and the modules 14, 40.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A system for modifying a vehicle structure, the system comprising:
   a vehicle body;
   a first module detachably attached to a structure of the vehicle body at an interface having a plurality of mounting points with a predetermined spacing;
   a detachable portion of the first module, wherein the detachable portion is detachably attached to a body portion of the first module; and
   a second module with mounting points having the predetermined spacing;
   wherein the first module is detachable from the vehicle body and replaceable on the vehicle body with the second module; and
   wherein the detachable portion is detachable from the body portion of the first module and subsequently attachable to second module;
   wherein the vehicle structure is a unibody vehicle structure;
   wherein the first module is a cargo platform;
   wherein the second module has a different overall size relative to the first module;
   wherein the first and second module are electrically connectable to the vehicle body;
   wherein the detachable portion is electrically connectable to the first module and the second module;
   wherein power can be provided by an electrical connection between the vehicle body and the second module at a same electrical interface that communicates with tail lamps and/or sensors of the detachable portion of the first module.

2. The system of claim 1, wherein the detachable portion includes lamps or sensors configured to operate with both the first module and the second module, such that no additional lamps or sensors are attached to the second module.

3. The system of claim 1, wherein the first module is a rear module, and the detachable portion is a rear portion of the rear module, wherein the detachable portion defines a rearmost surface of the rear module and the rear portion when attached to each other.

4. The system of claim 1, wherein the body portion of the first module defines a curved surface, and the detachable portion includes a corresponding curved surface that mates with the curved surface of the first module, wherein the curved surfaces of the first module and the second module combine to define a generally continuous outer curved surface of an overall body portion when the first module and the detachable portion are attached to each other.

5. The system of claim 1, wherein the second module includes a body portion and a recess, wherein the recess corresponds in size and shape to the detachable portion to receive the detachable portion of the first module.

6. The system of claim 5, wherein the body portion of the second module overhangs the recess.

7. A method for modifying a vehicle structure, the method including the steps of:
providing a vehicle body and a first module detachably attached thereto via plurality of mounting points disposed on the vehicle body with a predetermined spacing;
detaching the first module from the vehicle body;
detaching a detachable portion from a body portion of the first module;
attaching a second module to the vehicle body via the plurality of mounting points after detaching the first module; and
attaching the detachable portion to the second module after detaching the detachable portion from the first module;
wherein the detachable portion includes lamps or sensors, and no additional lamps or sensors are attached to the second module
wherein the vehicle structure is a unibody vehicle structure;
wherein the first module and second module have different overall sizes;
wherein the first and second module are electrically connectable to the vehicle body;
wherein the detachable portion is electrically connectable to the first module and the second module;
wherein power can be provided by an electrical connection between the vehicle body and the second module at a same electrical interface that communicates with the tail lamps and/or the sensors of the detachable portion of the first module.

8. The method of claim 7, wherein the second module defines a recess in which the detachable portion is received, wherein a body portion of the second module overhangs the recess.

9. A system for modifying a vehicle structure, the system comprising:
a vehicle body;
a first module assembly detachably attached to a structure of the vehicle body at an interface, the first module assembly including a first body portion attachable to the vehicle body at the interface and a detachable portion attachable to the first body portion, wherein first body portion and the detachable portion combine to define an overall body shape of the first module assembly;
a second body portion attachable to the vehicle body at the interface;
wherein the detachable portion is detachable from the first body portion of the first module assembly attachable to the second body portion to define a second module assembly;
wherein the first module assembly is detachable from the vehicle body and replaceable on the vehicle body with the second module assembly;
wherein the first and second body portions define respective first and second recess portions corresponding in size and shape to the detachable portion, such that the detachable portion is received in and fills one of the first or second recess portions to define the first or second module assembly.

10. The system of claim 9, wherein the first recessed portion defines a first recessed surface, and the second recessed portion defines a second recessed surface, wherein the detachable portion includes an outer surface corresponding to both the first and second recessed surfaces.

11. The system of claim 9, wherein the first body portion and the detachable portion combine to define to a continuous curved outer perimeter of the first module assembly when attached, and the second body portion and the detachable portion combine to define a continuous curved outer perimeter of the second module assembly when attached.

* * * * *